April 12, 1949.  W. PAGE ET AL  2,467,093
MACHINE FOR PROCESSING FABRIC PIECE GOODS,
ANIMAL SKINS, HIDES, AND THE LIKE
Filed June 19, 1943  3 Sheets-Sheet 1

William Page
William J. Short.  Inventors

April 12, 1949.    W. PAGE ET AL    2,467,093
MACHINE FOR PROCESSING FABRIC PIECE GOODS,
ANIMAL SKINS, HIDES, AND THE LIKE
Filed June 19, 1943    3 Sheets-Sheet 2

William Page
William F. Short.    Inventors

April 12, 1949. W. PAGE ET AL 2,467,093
MACHINE FOR PROCESSING FABRIC PIECE GOODS,
ANIMAL SKINS, HIDES, AND THE LIKE
Filed June 19, 1943 3 Sheets-Sheet 3

William Page
William J. Short
Inventors

Patented Apr. 12, 1949

2,467,093

UNITED STATES PATENT OFFICE 2,467,093

MACHINE FOR PROCESSING FABRIC PIECE GOODS, ANIMAL SKINS, HIDES, AND THE LIKE

William Page, Cranford, and William F. Short, Newark, N. J.

Application June 19, 1943, Serial No. 491,550

4 Claims. (Cl. 68—210)

1

Our invention relates to a machine for the treatment of piece-goods, small animal skins, hides and the like with chemicals or dyes, wherein material to be processed is deposited by gravity from a hopper into a treating drum from which the material after treatment is discharged by gravity directly into a drying drum and after a drying operation said material is discharged for storage in a finished condition.

One object of the invention is to provide in a machine of this character novel and improved means for depositing the material to be treated into the treating drum.

Another object is to provide a novel and improved construction and combination of a treating drum mounted to rotate on a horizontal axis beneath a floor or other support, a charging hopper movable upon said floor or support toward and away from the drum, and means to facilitate tilting of said hopper for discharging the contents thereof into said drum.

A further object is to provide such a combination of a treating drum and charging hopper wherein the treating drum has a cover, and means is provided for simultaneously tilting the hopper and elevating said cover of the drum to permit discharge of the contents of the hopper into the drum.

Other objects, advantages and results of the invention will be brought out by the following description in conjunction with the accompanying drawings in which Figure 1 is a front elevational view of a machine embodying our invention.

Figure 1:
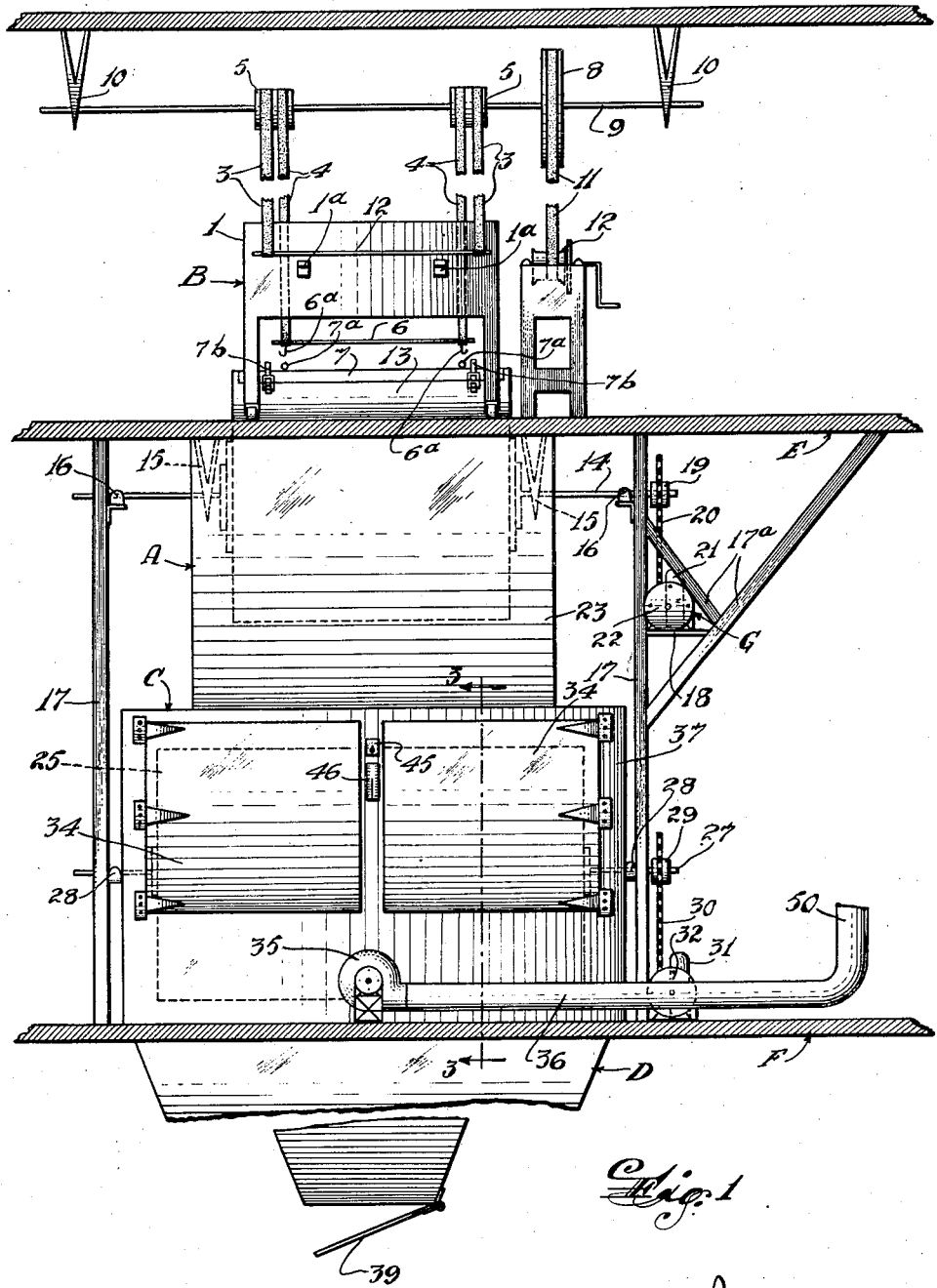
Figures 2, 6:
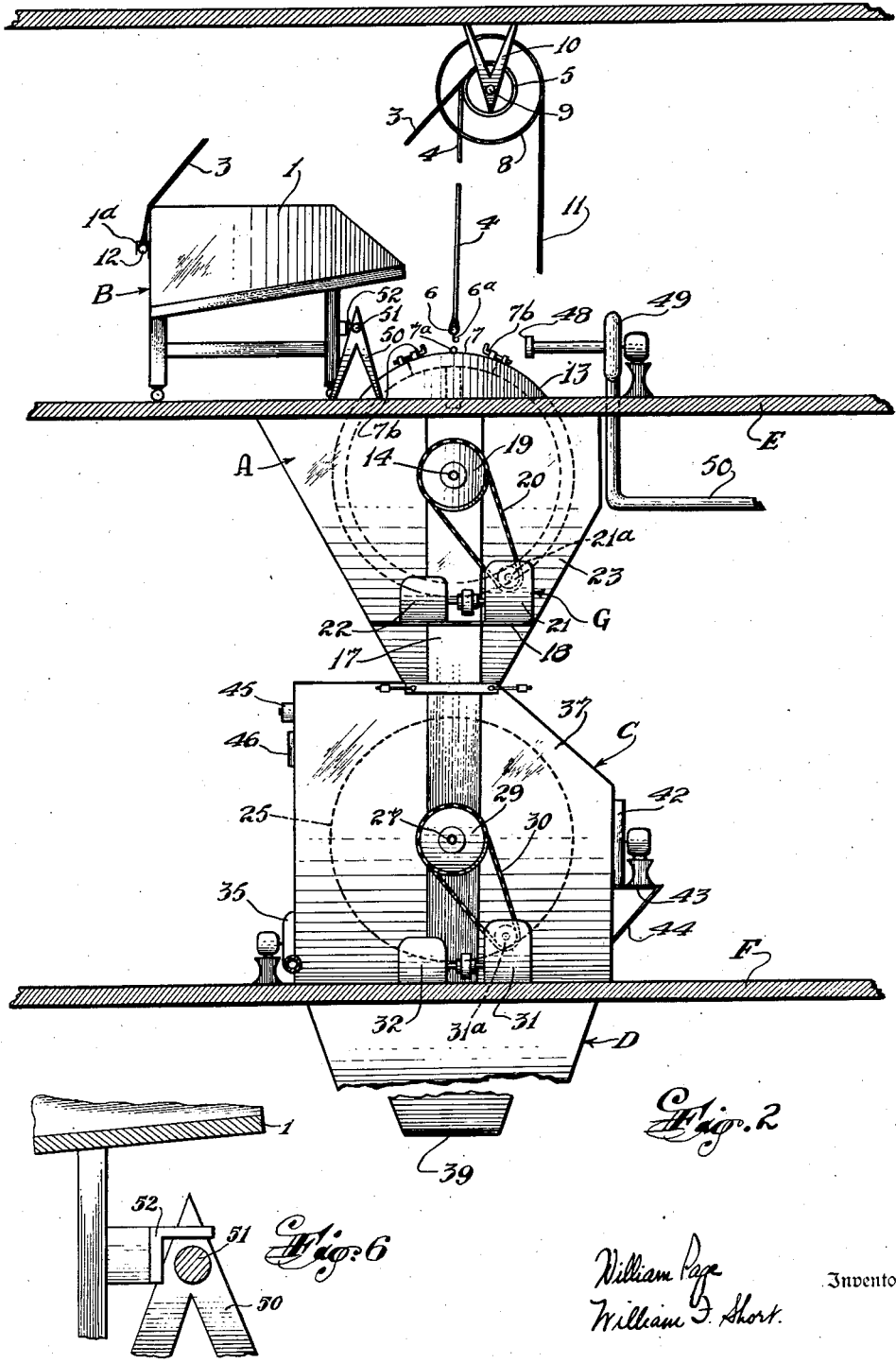
Figure 2 is a side elevational view thereof.
Figure 6 is an enlarged fragmentary vertical sectional view showing the hopper and the fulcrum therefor.

In general, our machine comprises a treating apparatus A, a charging apparatus B, a drying apparatus C and a discharge chute D. The material to be treated is conveyed by a portable hopper 1, which forms a part of the charging apparatus, to a treating drum 13 in which the material is treated with acids, dyes or the like and from which the materials are discharged under gravitational influence into the cage 25 of the drying apparatus where the materials are dried and then gravitationally discharged into the discharge chute D.

2

The treating drum 13 may be constructed of stainless steel, or of hardwood lined with glass or acid-proof plastic in such a manner as to prevent leakage and excessive wear. The cover thereof 7 should also be constructed of acid-proof material and so fitted to the drum as to be liquid and airtight.

A drying cage 25 is located in a drying chamber 37 and should also be constructed of acid and wear-resistant material in order to insure efficient service and durability. A cover is provided to prevent discharge of the material being processed until such time as the drying operation is concluded, and when removed, to provide an opening for receiving the material to be dried from the upper drum 13 after treatment therein.

The drum 13 and cage 25 are mounted on shafts or axles 14 and 27 respectively, the axle 14 being supported by hangers 15 and bearings 16, the axle 27 being supported by bearings 28. The supporting bearings 16 and 28 are attached to rigid columns 17 constructed of heavy steel which are bolted to the ceiling E and floor F of the factory level occupied by this portion of the machine. A drive mechanism G for the drum including a motor and a speed reducer, is mounted on a platform 18 secured by steel brackets 17a on one column 17. It can readily be seen from Figure 1 that this method of construction provides for a strong, rigid support for the heavy rotating parts of the machine, thus preventing operational disadvantages otherwise encountered because of excessive vibration.

The drive for the axle 14 of the drum 13 may be provided by a line shaft in the plant in which our machine is used. However, we prefer to employ an electric motor 22 connected to a standard speed-reducer 21, from which the power is relayed through sprocket 21a, then through a heavy chain 20 and large sprocket 19 to axle 14. All the above parts of the illustrated construction should be sufficiently rugged to meet the requirements of load presented by the type and weight of the material being processed.

The drive for the cage 25 is similar to that for the drum described above, that is an electric motor 32 is connected with a standard speed-reducer 31 from which the power is relayed through sprocket 31a, then through a heavy chain 30 and large sprocket 29 to axle 27. The speed of rotation of the drum may be varied according to the nature of the materials being treated and other conditions such as the amount of moisture in the material, atmospheric humidity, temperature, etc.

The electric current supply to the motors 22 and 32 may be controlled by simple push-button switches conveniently located on the upper or second floor level, and lower or first floor level. However, for ease of operation and for accuracy of control, we prefer to employ automatic magnetic brakes so regulated as to bring the openings of the drum 13 and cage 25 into the exact positions necessary for the charging with material to be processed and discharging thereof at the termination of the respective cycles of processing.

Our machine is provided with two chutes 23 and D serving as the means of egress of material being processed from drum 13 and cage 25 respectively. Chute 23 is so constructed as to enclose the area around and beneath drum 13 and between ceiling of the first floor and top of the drying chamber 37.

Chute D is so constructed as to permit passage of the dried, processed material from the cage 25 to the basement or storage area, upon rotation of the cage, after the covers have been removed. A cover 39 is provided to act as closure for the terminal end of chute D, serving to exclude entrance of cold air from the lower level into the drying chamber while the drying operation is in progress. The upper part of chute D extends to the first floor level at the rear and two sides of the machine.

The drying chamber 37 may be constructed of stainless steel or other acid-resistant material, the chemicals or dyes used in the process determining the type of construction used. Doors 34 are provided to permit access to the cage. Mounted in the frame-work between the two doors are a thermostatic control 45 and a thermometer 46, the temperature-sensitive parts thereof extending into the drying chamber in such a manner as not to interfere with the rotation of the cage 25 during the drying process. The thermostatic control 45 is connected to the motors of combined air blower and heater units 42 located at the rear of the drying chamber. The units are mounted on a platform 43 at the rear of the drying chamber, the platform being fastened to the drying chamber and to supports 44 in a manner to insure rigidity and freedom from vibration.

At the front of the drying chamber, an exhaust blower 35 is connected with an air collecting duct in such a manner to insure proper removal of cool and/or moisture-laden air therefrom, discharging such air into the exhaust pipe 36 which in turn connects with exhaust pipe 50 from the second floor level, the air and fumes from both exhaust pipes being then carried by a single pipe to point of discharge.

Figures 3, 4, 5:
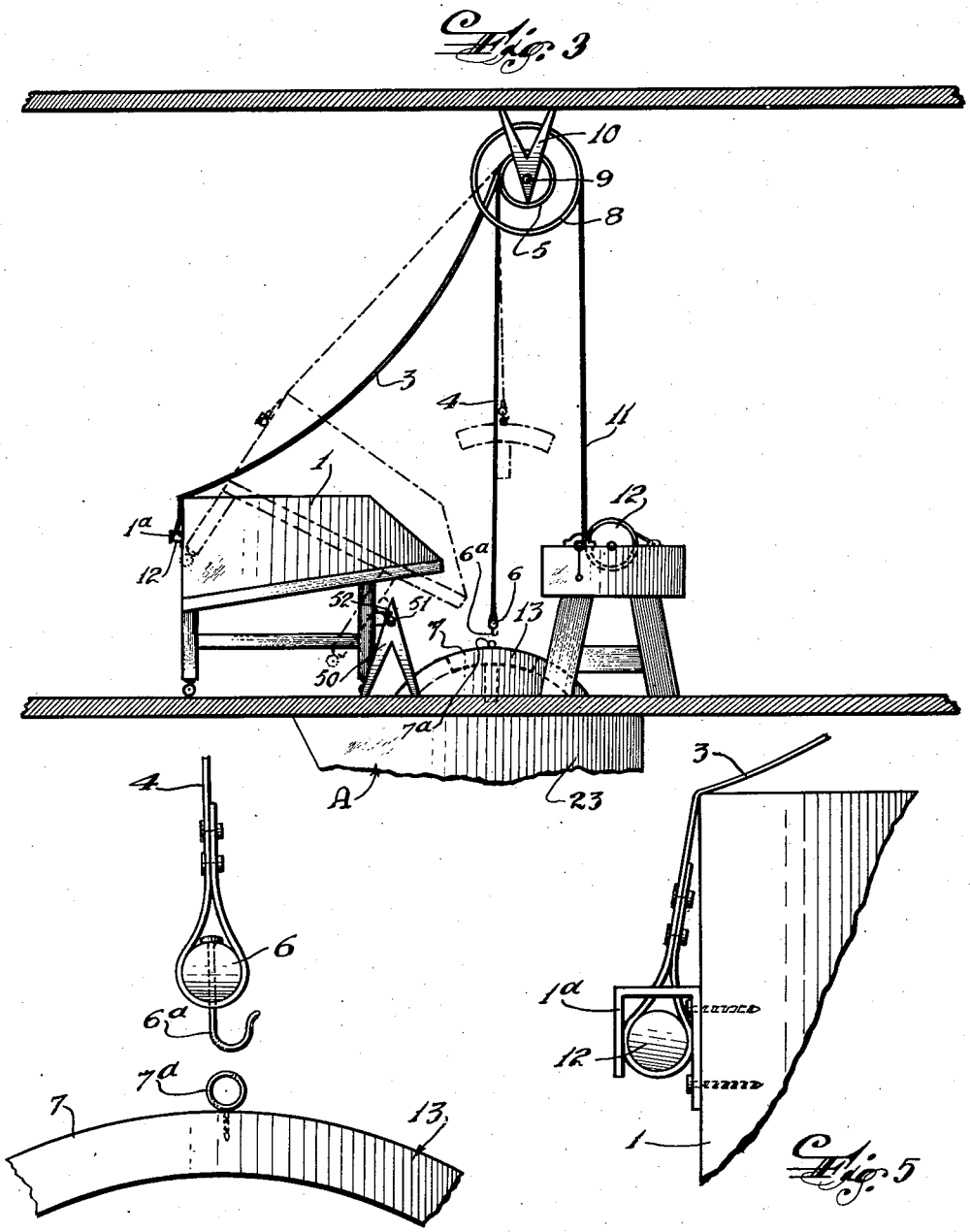
Figure 3 is a side elevational view of the charging apparatus, showing the mode of operation.
Figures 4 and 5 are fragmentary enlarged side elevational views of the treating drum and the charging hopper respectively.

Our invention resides particularly in the mechanism for charging the drum, shown in detail in Figure 4. The hopper 1 is so constructed as to have adequate capacity for a complete charge for the drum 13, of dimensions to permit discharge of material into said drum without loss or spilling. The hopper is mounted on casters or small wheels so as to be readily movable and is provided with flanges or fittings 1a at its rear by which a bar 12 may be attached for hoisting. Another set of flanges 52 is provided at the front of the hopper to serve as bearing surfaces to engage a bar 51 for tilting of the hopper. Two hangers 50 bolted to the floor serve to support the bar 51 which acts as the fulcrum bar and bearing for flanges 52. The hopper is tilted for discharging by a winch 12 on which a belt 11 is wound. The belt 11 is fastened at one end to a large pulley 8 and in winding on the aforementioned winch causes said pulley to rotate. Pulley 8 is rigidly fastened to the shaft 9 which is supported from the ceiling by hangers 10. Two wide, smaller pulleys 5 are mounted on and rotated by the rotation of the shaft, winding belts 3 and 4 which are connected to the bar 12 and another bar 6 respectively. The bar 6 carries hooks 6a to separably engage eyes 7a on the cover of the drum 13.

To charge the drum 13, the hopper is moved to cause engagement of the flanges 52 with the bar 51, the bar 12 is slipped under the flange 1a, and the hooks 6a are connected to the eyes 7a, as shown by solid lines in Figure 4. Then the windlass is operated to wind the belts 3 and 4 on the pulleys 5, whereupon the hopper 1 is tilted upwardly and forwardly and simultaneously the cover 7 of the drum 13 is raised, as shown by dot and dash lines, so that the material in the hopper is deposited into the drum 13. Then the cover 7 is replaced and clamped in closed position. Any suitable clamps or bolts 7b may be used.

On the side of the machine opposite to the hopper 1, an exhaust blower 49 is provided for the removal of any noxious fumes or vapors emanating from the drum 13 when cover is removed for charging or discharging. A suitable hood (not shown) may be placed over the drum to trap such vapors. A screened collector nozzle 48 extends to the edge of the drum opening. The blower 49 discharges into exhaust pipe 50 which runs down through the floor to connect with exhaust pipe 36, the exhausts from both pipes being carried from this point by a single pipe to point of final discharge.

Method of operation: The hopper 1 is filled with a sufficient quantity of material to charge drum 13. Belts 3 are attached to back of hopper, belts 4 to cover 7 of drum. The winch is then turned, causing the cover to be raised and the hopper to discharge into the drum simultaneously. Before this operation is started, should the process so require, the drum is charged with acids, dyes or other material, which are thoroughly mixed, when necessary, by preliminary rotation of the drum. After discharge of the material to be processed into the drum, the winch is rotated in the opposite direction, causing the hopper to lower and the cover to descend on the drum. Belts 3 and 4 are then detached, the cover 7 secured and the drum rotated. The period of rotation of the drum can best be determined by the experience of the operator with the type of material being processed. While the drum is rotating, the hopper is again charged with sufficient material for the next loading. At the termination of the drumming, the covers having been removed from the cage 25 by the operator on the first floor and the cage positioned to receive the discharge from the chute 23, the cover of the drum 13 is again removed and the drum rotated so as to discharge the material into the chute 23 and thence into the cage 25. After the discharge has been completed, the treated material is dried in the cage 25 and thereafter discharged through the discharge chute D.

It will be understood that the drawings illustrate the machine schematically and that the construction of the machine may be widely modified and changed within the spirit and scope of the invention.

What we claim is:

1. A machine of the character described including a support having a horizontal floor, a drum rotatably mounted on a horizontal axis beneath said floor and having an opening with a removable cover for receiving and discharging material into and from the drum respectively, a charging hopper movable upon said floor toward and away from said drum, a fulcrum bar on said floor adjacent said drum and means on said hopper to separably engage said bar to permit tilting of said hopper about said bar as a fulcrum, and means for tilting said hopper to discharge its contents by gravity into said drum.

2. A machine of the character described including a support having a horizontal floor, a drum rotatably mounted on a horizontal axis beneath said floor and having an opening with a removable cover for receiving and discharging material into and from the drum respectively, a charging hopper movable upon said floor toward and away from said drum, a fulcrum bar on said floor adjacent said drum and means on said hopper to separably engage said bar to permit tilting of said hopper about said bar as a fulcrum, and means for tilting said hopper and simultaneously elevating said cover of the drum from said opening to discharge the contents of the hopper through said opening into said drum.

3. A machine of the character described including a support having a horizontal floor, a drum rotatably mounted on a horizontal axis beneath said floor and having an opening with a removable cover for receiving and discharging material into and from the drum respectively, a charging hopper mounted on said floor, and means for simultaneously tilting said hopper and elevating said cover from said opening in the drum to discharge the contents of said hopper by gravity through said opening into said drum.

4. The machine set forth in claim 3 wherein the last-named means includes a shaft journaled above said drum and said hopper and having a pulley thereon, two flexible connectors each having one end connected to said pulley so that rotation of the pulley will wind said flexible connectors on the pulley, the other end of one of said flexible connectors being connected to said hopper and the corresponding end of the other connector being separably connected to said cover of said drum, and means for rotating said shaft so that said connectors simultaneously will be wound on said pulley to tilt said hopper and elevate said cover at the same time.

WILLIAM PAGE.
WILLIAM F. SHORT.

REFERENCES CITED

The following references are of record in the file of this patent:

UNITED STATES PATENTS

| Number | Name | Date |
|---|---|---|
| 1,060,801 | Watkins | May 6, 1913 |
| 1,871,663 | Carroll | Aug. 16, 1932 |
| 2,075,010 | Angelus | Mar. 30, 1937 |
| 2,165,487 | Johnson | July 11, 1939 |
| 2,314,748 | White | Mar. 23, 1943 |

OTHER REFERENCES

Palmer House, "The Most Modern Laundry in the World," published by the American Laundry Machinery Co., 1927. (Copy in Div. 43, Class 8-137.) Page 4 relied on.